US012590432B2

(12) United States Patent
Dagner et al.

(10) Patent No.: US 12,590,432 B2
(45) Date of Patent: Mar. 31, 2026

(54) SOIL PROCESSING MACHINE AND METHOD FOR OPERATING A SOIL PROCESSING MACHINE

(71) Applicant: Hamm AG, Tirschenreuth (DE)

(72) Inventors: Josef Dagner, Altenstadt (DE); Stefan Braunschläger, Bärnau (DE); Thomas Klein, Mitterteich (DE); Michael Sperber, Waldsassen (DE)

(73) Assignee: HAMM AG, Tirschenreuth (DE)

( * ) Notice: Subject to any disclaimer, the term of this patent is extended or adjusted under 35 U.S.C. 154(b) by 767 days.

(21) Appl. No.: 17/953,582

(22) Filed: Sep. 27, 2022

(65) Prior Publication Data

US 2023/0099177 A1 Mar. 30, 2023

(30) Foreign Application Priority Data

Sep. 29, 2021 (DE) ..................... 10 2021 125 185.0

(51) Int. Cl.
*E02D 3/026* (2006.01)
*B62D 12/00* (2006.01)

(52) U.S. Cl.
CPC ............. *E02D 3/026* (2013.01); *B62D 12/00* (2013.01)

(58) Field of Classification Search
CPC .............. B60K 17/10; B60Y 2200/416; B62D 5/064; B62D 5/065; B62D 12/00; E02D 3/026
USPC ........................................................ 140/420
See application file for complete search history.

(56) References Cited

U.S. PATENT DOCUMENTS

| | | | |
|---|---|---|---|
| 2006/0260301 A1 | 11/2006 | Yoshida |
| 2016/0290367 A1 | 10/2016 | Lillemets |
| 2021/0156403 A1 | 5/2021 | Rushton |

FOREIGN PATENT DOCUMENTS

| | | |
|---|---|---|
| DE | 2950391 | 7/1981 |
| DE | 19746090 | 3/1999 |
| DE | 102007016112 | 11/2007 |
| DE | 102016107763 | 11/2016 |
| DE | 112016000782 | 10/2017 |
| DE | 102018127544 | 5/2020 |
| DE | 10 2019 002 439 | 10/2020 |
| EP | 4151889 | 3/2023 |
| JP | 3-98181 | 10/1991 |
| JP | 6-270425 | 10/1993 |
| JP | 09182213 | 11/1997 |
| JP | 11-227620 | 8/1999 |
| JP | 2002-188113 | 7/2002 |
| JP | 200397702 | 4/2003 |

(Continued)

OTHER PUBLICATIONS

European Search Report issued in EP App. No. 22192049.9, dated Feb. 14, 2023, 11 pages.

(Continued)

*Primary Examiner* — Valentin Neacsu
*Assistant Examiner* — Felicia L. Brittman-Alabi
(74) *Attorney, Agent, or Firm* — RANKIN, HILL & CLARK LLP

(57) ABSTRACT

A soil processing machine, in particular a soil compactor, includes a hydraulic steering system with at least one steering element actuated with pressurized fluid and an electrohydraulic pressurized fluid source with at least one steering pressurized fluid pump that can be driven by at least one electric motor for feeding pressurized fluid into a steering pressurized fluid circuit.

16 Claims, 2 Drawing Sheets

(56)                    References Cited

FOREIGN PATENT DOCUMENTS

| JP | 200407 4817 | 11/2004 | | |
| JP | 200567522 | 3/2005 | | |
| JP | 2005029111 | 3/2005 | | |
| JP | 2006-213259 | 8/2006 | | |
| JP | 2006-233843 | 9/2006 | | |
| JP | 2009255870 | 5/2009 | | |
| WO | WO-2015094024 A1 * | 6/2015 | ............ | B62D 5/065 |
| WO | 2020/200509 | 10/2020 | | |

OTHER PUBLICATIONS

German Search Report filed in Serial No. 10 2021 125 185.0 dated
Jun. 9, 2022.

* cited by examiner

SOIL PROCESSING MACHINE AND METHOD FOR OPERATING A SOIL PROCESSING MACHINE

The present invention relates to a soil processing machine, such as a soil compactor, which can be used to compact the structural material of ground, such as asphalt, soil, or gravel. Furthermore, the present invention relates to a method for operating such a soil processing machine.

An example of such a soil processing machine designed as a soil compactor is shown in FIG. 1. This soil processing machine 10, designed as a soil compactor, is constructed with a rear carriage 12 and a front carriage 14, which is connected to the rear carriage 12 so that it can pivot about an approximately vertical steering axis. Drive wheels 16 are provided on the rear carriage 12 which can be driven to rotate in order to move the soil compactor 10 over the ground 18 to be compacted. A soil processing roller 20, designed as a compactor roller, is rotatably supported on the front carriage 14. In the construction of a soil compactor as shown in FIG. 1, the soil processing roller 20, for example, can also be driven to rotate. Alternatively, the soil processing roller 20 can roll over the ground 18 only being advanced by the drive wheels 16. For example, in the case of a soil compactor, in which a compactor roller is also provided on the rear carriage 12, one or both of the compactor rollers could be driven to rotate to move the soil compactor over the ground 18.

Also provided on the rear carriage 12 is an operator's station 22 in which an operator can sit on an operator's seat 24 in order to operate the soil compactor. The operator's station 22 also contains various actuators, which will be explained below, via which an operator sitting on the operator's seat 24 in the operator's station 22 can operate the soil compactor. In general, soil compactors of this type have a drive unit designed as a diesel internal combustion engine on the rear carriage 12. It should be pointed out that, for the purposes of the present invention, the rear carriage 12 is considered to be that system region of a soil compactor on which such a drive unit and/or the operator's stand 22 are accommodated. In the case of a soil compactor constructed as a pivot-steered tandem roller, in which a steering frame rotatably supporting a soil processing roller is pivoted about a respective steering axis on a frame region provided in the central region of the soil compactor and generally supporting a drive unit and an operators station in both end regions of same, the centrally arranged region of the soil compactor, which supports the two steering frames pivotably, is to be regarded as the rear carriage for the purposes of the present invention.

The drive unit drives one or more hydraulic pumps to provide pressurized fluid in various hydraulic circuits. For example, a hydraulic drive circuit can be provided, via which hydraulic motors assigned to the drive wheels 16 can be supplied with pressurized fluid in order to move the soil compactor over the ground 18. If such a soil compactor has one or more compactor rollers or soil processing rollers 20 that are driven to rotate, hydraulic motors can also be assigned to these in order to drive them to rotate. Another hydraulic circuit can be used to drive an imbalance system in the soil processing roller 20. An imbalance system of this type, which can be designed to generate an oscillating movement and/or a vibratory movement of the soil processing roller 20, may also comprise one or more hydraulic motors to drive unbalanced masses for rotation. Another hydraulic circuit can be assigned to a steering system. The pressurized fluid present in a hydraulic steering circuit of this type can direct hydraulic fluid, via a hydraulic steering unit, to one or two steering piston/cylinder units 28 acting as steering elements 26, as a function of a steering movement of a steering actuator, for example a steering wheel. Due to such steering piston/cylinder units 28, the front carriage 14 and the rear carriage 12 are pivoted relative to one another about the steering axis, as a result of which the soil compactor is steered over the ground 18 as it moves.

It is the object of the present invention to provide a soil processing machine and a method for operating a soil processing machine with which a hydraulic drive system can be operated with reduced energy required.

According to the invention, this object is achieved by a soil processing machine, in particular a soil compactor, comprising a hydraulic steering system with at least one steering element actuated with pressurized fluid and an electrohydraulic pressurized fluid source with at least one steering pressurized fluid pump that can be driven by at least one electric motor for feeding pressurized fluid into a steering pressurized fluid circuit.

In a soil processing machine constructed according to the invention, the energy for operating the hydraulic steering system is provided by an electric motor supplied from a battery or the like. Such an electric motor as a drive for a steering pressurized fluid pump has the advantage over the use of a diesel internal combustion engine in that the electric motor can be operated in a way that is adapted to the energy or pressurized fluid required at the moment and offers the option of spontaneously changing the speed of same in order to adjust the amount of pressurized fluid conveyed to changing needs. Such short-term changes cannot be realized when using a diesel internal combustion engine by changing the operating state thereof. Nevertheless, due to the inclusion of the hydraulic steering circuit, the hydraulic steering system according to the invention offers the advantage, for example compared to steering systems operated purely by an electric motor, that an emergency steering property can be maintained, and that such a hydraulic steering system has a particularly high overload or shock resistance and provides an operator with mechanical feedback on the current steering state or a steering movement.

The soil processing machine constructed according to the invention can comprise a rear carriage and a front carriage which can be pivoted about a steering axis with respect to the rear carriage, wherein at least one steering element acting between the front carriage and the rear carriage comprises a steering piston/cylinder unit. As already mentioned at the outset, it is advantageous to provide two steering elements designed, for example, as steering piston/cylinder units, wherein one or both of these steering elements can be designed to be double-acting, i.e., acting in both directions of actuation.

In order to convert the actuation of a steering actuator, for example a steering wheel, by an operator into a corresponding adjustment movement of a steering element, the hydraulic steering system can comprise a hydraulic steering unit, wherein the hydraulic steering unit is supplied with pressurized fluid from the steering pressurized fluid circuit and the at least one steering element is exposed to pressurized fluid as a function of an actuation of a steering actuator.

The hydraulic steering system can comprise at least one steering sensor, wherein the steering sensor is designed to provide steering information representing a steering state. For example, such a steering sensor can detect the rotation of a steering shaft, and the steering information can represent a steering angle and/or a steering angle change rate. It should be noted that, for the purposes of the present invention, a steering angle change rate represents a change in the steering angle over time, for example the change over time of a rotational position of a steering shaft or the change in the angle between a front carriage and a rear carriage of a soil processing machine.

In order to support needs-based operation of the hydraulic steering system, it is proposed that the hydraulic steering system be designed to operate the electric motor of the electrohydraulic steering pressurized fluid source at a speed dependent on the steering information.

For this purpose, for example, the hydraulic steering system can be designed to operate the electric motor of the electrohydraulic steering pressurized fluid source at increasing speed as the steering angle increases and/or to operate the electric motor at increasing speed as the steering angle change rate increases.

For a needs-based and thus energy-saving operation of the steering system, it is further proposed that the hydraulic steering system be designed to operate the electric motor of the electrohydraulic steering pressurized fluid source at a speed dependent on the driving operating state of the soil processing machine. It should be pointed out that, for the purposes of the present invention, such a driving operating state is characterized by states that are not directly related to a steering movement or states that do not themselves represent the steering movement.

For example, the driving operating state of the soil processing machine can comprise the following states:

a parking state, wherein a driving actuator is placed in a parking position and/or an operator's seat is not occupied in the parking state;

a driving preparation state, wherein the driving actuator is placed in a driving preparation position in the driving preparation state;

a driving state, wherein the driving actuator is placed in a driving position in the driving state;

The hydraulic steering system can be designed taking into account these different states considered to be driving operating states to keep the electric motor of the electrohydraulic steering pressurized fluid source out of operation in the parking state;

and/or to operate the electric motor of the electrohydraulic steering pressurized fluid source at a base speed in the driving preparation state;

and/or to operate the electric motor of the electrohydraulic steering pressurized fluid source at a working speed which is higher than the base speed in the driving state.

In a design that is simple in terms of design and control technology, the hydraulic steering system can be designed to always operate the electric motor of the electrohydraulic steering pressurized fluid source at the working speed in the driving state. This means that, whenever such a soil processing machine is in the driving state, this electric motor is operated at the working speed, i.e. at a speed higher than the base speed, regardless of whether the machine is being steered, i.e., there is a change in the steering state.

In an alternative variant, which is particularly advantageous in terms of efficient use of energy, the hydraulic steering system can be designed to operate the electric motor of the electrohydraulic steering pressurized fluid source at the working speed when the electric motor enters the driving state and/or is in the driving state, if the steering information indicates the presence of a change in the steering state. This means that the increase in the speed of this electric motor can be limited to those phases during the driving state in which energy has to be expended to change the steering state, i.e. to change the steering angle. In phases in which this is not required, i.e. in which there is no steering and therefore there is no change in the steering angle, for example when driving straight ahead or when cornering with an essentially constant curve radius, the electric motor can be operated at a lower speed, for example the base speed, and thus operated with less energy consumption.

An energy-saving operation that is further adapted to the present needs can be supported in that the base speed depends on a temperature of the hydraulic fluid in the hydraulic steering circuit and/or in a working hydraulic system fed from the hydraulic steering circuit, and/or in that the base speed depends on a load requirement in a working hydraulic system fed from the hydraulic steering circuit.

In a soil processing machine constructed according to the invention, operation of the hydraulic steering system adapted to the energy demand or the demand for pressurized fluid is ensured in that the electric motor provided for driving the steering pressurized fluid pump is operated or controlled at a speed adapted to the current demand. Structural measures on the hydraulic steering pump which allow the flow rate to be adapted to the current need are therefore not required, so that the hydraulic steering pump can be a constant flow rate pump, in which the change in the flow rate of the hydraulic fluid is exclusively effected by a change in the speed of the pump or the electric motor driving the pump.

With the soil processing machine according to the invention, a hydraulic drive system can also be provided for moving the machine over a region of ground to be cultivated, wherein the hydraulic drive system comprises an electrohydraulic pressurized fluid source with at least one electric motor and at least one hydraulic drive pump for feeding pressurized fluid into a hydraulic drive circuit and at least one hydraulic drive motor fed with pressurized fluid from the hydraulic drive circuit. The hydraulic drive system is therefore also an electrohydraulic system which, like the electrohydraulically operating steering system, offers the advantage that the operation of the electric motor of the hydraulic drive system can be adapted quickly or spontaneously to changes in the operating state or required changes in the operating state.

In a particularly advantageous embodiment, the hydraulic steering system and the hydraulic drive system comprise electric motors that can be operated independently of one another. This means that each of these hydraulic systems is assigned an independent electric motor or several independently working electric motors and the electric motor of the hydraulic steering system is not intended to supply the hydraulic drive motor(s) with pressurized fluid, while the electric motor of the hydraulic drive system is not intended to supply a hydraulic steering unit or one or more steering elements with pressurized fluid. This makes it possible to operate each of these electrohydraulic systems independently of the other respective system in a manner that is optimally adapted to the requirements in the respective system.

Regardless of whether the various hydraulic systems can be assigned independent electric motors that can be operated independently of one another, the hydraulic steering system can be designed to supply pressurized fluid to the hydraulic drive circuit via the hydraulic steering circuit. This makes it possible, for example, to compensate for a loss of pressurized fluid occurring in the hydraulic drive circuit or for a discharge of pressurized fluid from the hydraulic steering circuit in a targeted manner in the hydraulic drive circuit.

The hydraulic steering system can also be designed to return pressurized fluid back to a fluid reservoir via the hydraulic steering circuit. This means that the hydraulic steering system or the hydraulic steering circuit thereof can in principle be an open circuit which allows the pressurized fluid present therein to be returned to the fluid reservoir in order to avoid excessive heating.

The object mentioned at the outset is further achieved by a method for operating a soil processing machine, preferably a soil processing machine constructed according to the invention, the soil processing machine comprising a hydraulic steering system, wherein the hydraulic steering system comprises at least one steering element actuated with pressurized fluid and an electrohydraulic pressurized fluid source with at least one steering pressurized fluid pump that can be driven by at least one electric motor for feeding pressurized fluid into a steering pressurized fluid circuit and at least one steering sensor, wherein the steering sensor provides steering information representing a steering state, wherein the electric motor of the electrohydraulic steering pressurized fluid source is operated at a speed dependent on the steering information.

With this method, the electric motor of the electrohydraulic steering pressurized fluid source can be operated at increasing speed as the steering angle increases and/or the electric motor of the electrohydraulic steering pressurized fluid source can be operated at increasing speed as the steering angle change rate increases.

The present invention is described in detail below with reference to the attached figures. In the drawing.

Figure 1:
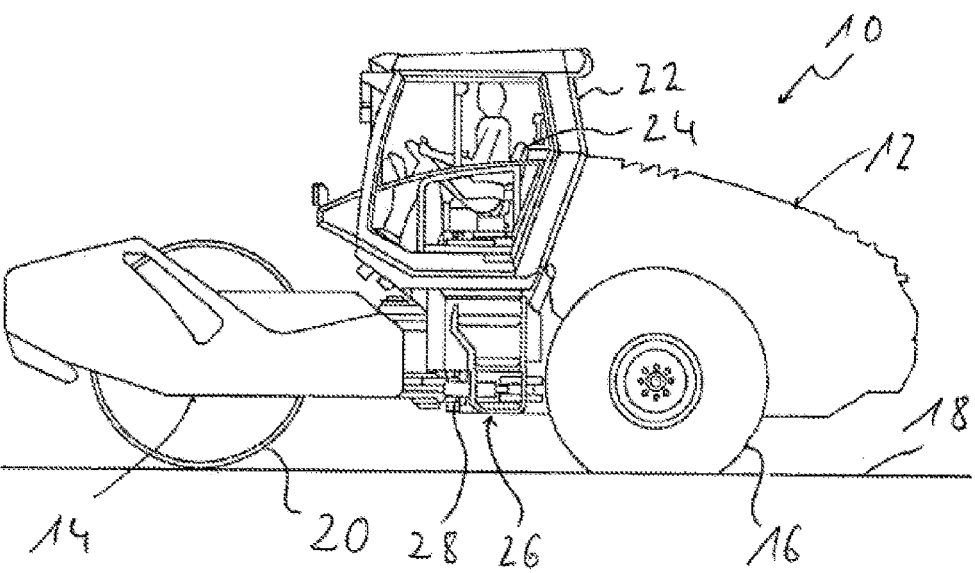
FIG. 1 is a side view of a soil processing machine designed as a soil compactor.

Before the structure and function of a hydraulic steering system and a hydraulic drive system of a soil processing machine are explained in detail below with reference to FIG. 2, it should be pointed out that the systems described below with reference to FIG. 2 can be used with a soil processing machine 10 designed as a soil compactor, as shown in FIG. 1. In principle, however, it should be noted that the systems described below with reference to FIG. 2 can also be used in differently designed soil processing machines, for example soil processing machines that have soil processing rollers on a front carriage and on a rear carriage.

Figure 2:
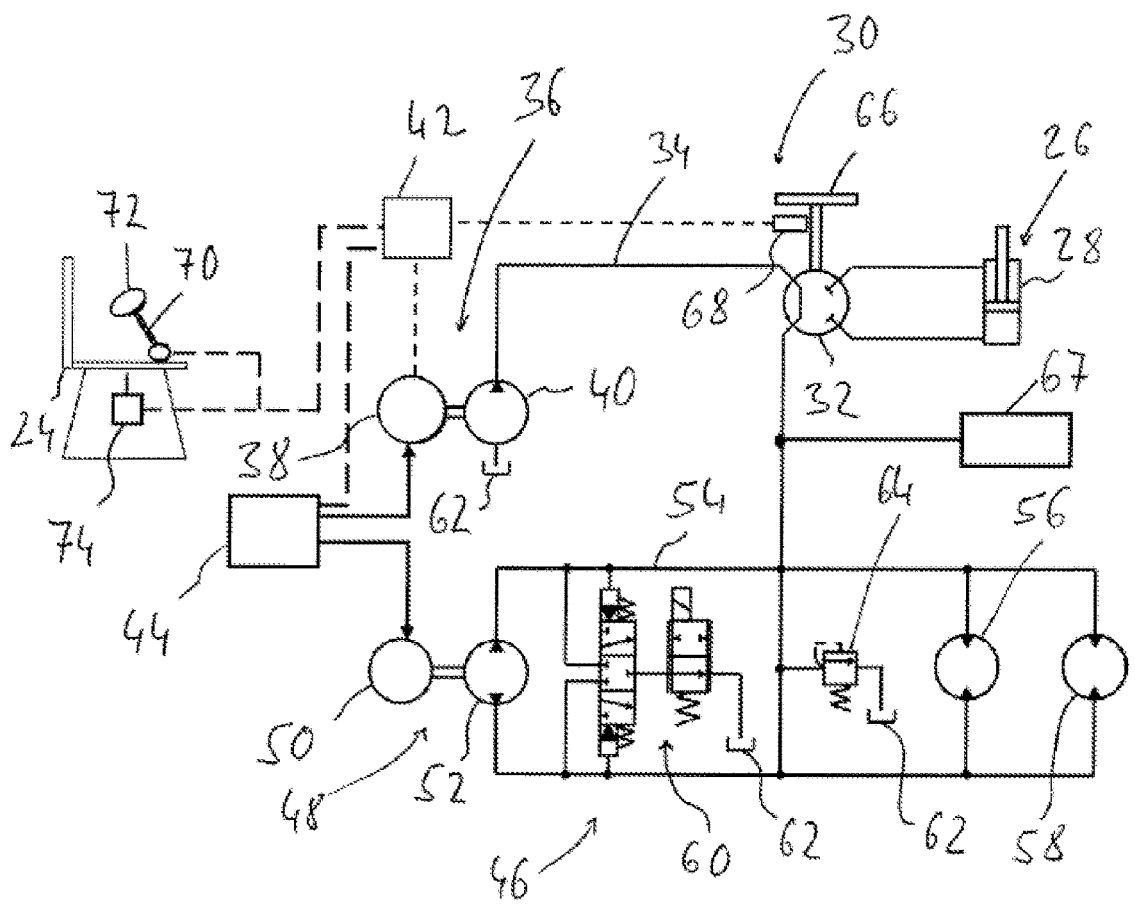
FIG. 2 is a principle representation of a hydraulic steering system and a hydraulic drive system of a soil processing machine.

FIG. 2 shows a hydraulic steering system, generally designated as 30. The hydraulic steering system 30 comprises one or more steering elements 26 designed as double-acting steering piston/cylinder units 28, which are coupled to a steering pressurized fluid circuit 34 via a hydraulic steering unit 32. The hydraulic steering system 30 comprises an electrohydraulic pressurized fluid source 36 with an electric motor 38 and a steering pressurized fluid pump 40 driven by the electric motor 38. The electric motor 38 of the hydraulic steering system 30 is actuated by a control unit 42 and is supplied from a voltage source, for example a battery 44, in order to drive the steering pressurized fluid pump 40. An electrical voltage can be applied to the electric motor 38 from the battery 44 in accordance with corresponding control specifications from the control unit 42.

FIG. 2 further shows a hydraulic drive system, generally designated as 46. The hydraulic drive system 46 comprises a hydraulic pressurized fluid source 48 with an electric motor 50 and a hydraulic drive pump 52 driven by the electric motor 50. The hydraulic drive pump 52 conveys a fluid, for example hydraulic oil, in a hydraulic drive circuit 54 and thus supplies two hydraulic drive motors 56, 58 integrated into the hydraulic drive circuit 54 with pressurized fluid. For example, the two hydraulic drive motors 56, 58 can be assigned to two soil processing rollers provided on a soil compactor in order to drive each of these soil processing rollers to move the soil compactor. In the construction of a soil processing machine shown in FIG. 1, one of the two hydraulic drive motors 56, 58 could be assigned to one of the two drive wheels 16, and the other of the two hydraulic drive motors 56, 58 could be assigned to the other drive wheel 16. In a soil processing machine with a soil processing roller divided, for example, into two segments lying next to one another in the direction of the roll axis of rotation, one of the hydraulic drive motors 56, 58 could be assigned to each of the segments of such a divided soil processing roller.

The hydraulic drive circuit 46 also comprises a discharge valve assembly 60 via which fluid can be discharged from the hydraulic drive circuit 46 to a fluid reservoir 62. The hydraulic steering pump 40 conveys fluid from this fluid reservoir 62 into the hydraulic steering circuit 34, which, as shown in FIG. 2, is linked to the hydraulic drive circuit 54 in such a way that fluid discharged from the hydraulic steering pump 40 into the hydraulic steering circuit 34 as pressurized fluid, for example hydraulic oil, can be introduced into the hydraulic drive circuit 46. Thus, it is possible to keep the quantity of fluid present in the hydraulic drive circuit 54 essentially constant, for example when fluid is discharged from the hydraulic drive circuit 46 into the fluid reservoir 62 via the discharge valve assembly 60, by replenishing fluid from the hydraulic steering circuit 34. Fluid leaks occurring in the hydraulic drive circuit 54 can also be compensated for in this way.

The hydraulic steering circuit 34 also comprises a return valve 64 via which fluid or pressurized fluid can be discharged from the hydraulic steering circuit 34 back into the fluid reservoir 62. The return valve 64 can be pressure-controlled, for example, so that, when the fluid pressure in the hydraulic steering circuit 34 or even in the hydraulic drive circuit 54 exceeds a predetermined threshold pressure, fluid can be supplied to the fluid reservoir 62. The return valve 64 thus works as a pressure relief valve.

FIG. 2 also shows that one or more working hydraulic systems 67 are coupled to the hydraulic steering circuit 34 in order to supply them with pressurized fluid from the hydraulic steering circuit 34 or via the hydraulic steering pump 40. Such working hydraulic systems 67 can be systems that are also to be operated, for example, when the hydraulic drive circuit 54 is inactive. For example, a parking brake of the soil processing machine 10 can be such a working hydraulic system 67 as well as an edge-pressing device present in soil compactors which is used for compacting asphalt material and which can also be raised or lowered when the soil compactor is stationary.

In order to steer a soil processing machine, for example the soil processing machine 10 shown in FIG. 1, a steering-actuating element 66 is provided, generally designed as a steering wheel. An operator occupying a seat in the operator's station 22 can steer the soil processing machine 10, which is moving over the ground 18 to be cultivated, by operating the steering actuator 66, i.e. by turning a steering wheel. The steering movement of the steering actuator 66 in the hydraulic steering unit 32 is converted into a corresponding supply of pressurized fluid into one of the chambers of each steering piston/cylinder unit 28 and a corresponding discharge of pressurized fluid from the other of the two chambers of each steering piston/cylinder unit 28.

The actuation of the steering actuator 66 is detected by a steering sensor 68. This steering sensor can detect, for example, the rotational movement of a steering shaft coupled to the steering actuator 66 for joint rotation and can output a signal containing information representing the steering state to the control unit 42. This information can be, for example, information about the current rotational position of the steering actuator 66 or the steering shaft coupled thereto, which represents a steering angle. A steering angle of zero, for example, can reflect a steering state corresponding to straight-ahead driving. A steering angle that increases in value can represent an increasing bending of the front carriage 14 with respect to the rear carriage 12, wherein the sign represents the steering direction, i.e. the bending direction, for example.

A steering angle change rate can be determined from the change over time in a signal representing the steering position. Alternatively, a signal can be generated directly from the movement, for example, of the steering actuator 66 or the steering shaft coupled thereto, which signal represents the rotational speed and thus the steering angle change rate.

It should also be pointed out that information representing the steering state can also be derived, for example, from the respective actuating state or movement state of a steering piston/cylinder unit 28 or provided directly by a sensor system acting or measuring between the front carriage 14 and the rear carriage 12.

Additional elements, via which an operator can operate such a soil processing machine 10, are provided in the operator's station 22. The operator can set the soil processing machine 10 in motion by means of a driving actuator 72 designed, for example, as a driving actuation lever 70. This means that, for example by pivoting the driving actuation lever 70, the electric motor 50 of the electrohydraulic pressurized fluid source 48 of the hydraulic drive system 46 is operated at a speed which corresponds to the driving operating state specified by the operator. For example, the operator can move the driving actuation lever 70 to a parking position. When the driving actuation lever 70 is in the parking position, the soil processing machine 10 is basically at a standstill and a parking brake can be activated, for example, in order to prevent the machine from rolling away. A driving preparation state is assumed by pivoting from the parking position into a driving preparation position. In the driving preparation state, the hydraulic drive motors 56, 58 still remain inactive, i.e. the electric motor 50 is kept inoperative as in the parking state, but the parking brake is released, for example. When pivoting from the driving preparation position corresponding to the driving preparation state to a driving position corresponding to a driving state, a driving speed setpoint specification and direction specification, for example, corresponding to the respective pivot position is converted into a rotational speed or direction of rotation of the electric motor 50 by the control unit 42, so that it drives the hydraulic drive pump 52 in a direction of rotation corresponding to a respective driving direction and both hydraulic drive motors 56, 58 are supplied with pressurized fluid, whereby the soil processing machine 10 is moved over the ground 18.

The operator's seat 24 can have a seat occupancy sensor 74 assigned thereto, which provides information about whether an operator is sitting on the operator's seat 24 or not. This information, like the information about a respective operating position or an actuation state of the driving actuator 72, can be introduced into the control unit 42 in order to operate the electric motor 38 of the electrohydraulic pressurized fluid source 36 in the manner described in the following.

Taking into account the information representing the seat occupancy or the actuation state of the driving actuator 72, the control unit 42 can control the electric motor 38, for example, in such a way that, when the driving actuator 72 is placed in the parking position, the electric motor 38 is deactivated or is kept in a deactivated state, which means that the control unit thereof is deactivated. Alternatively or additionally, this can take place when the information supplied by the seat occupancy sensor 74 indicates that there is no operator sitting on the operators seat 24, with the result that a parking brake which is optionally also supplied is activated and that hold-open pressure is no longer being provided therefor. Furthermore, it is also structurally ensured that, in the event of a failure of the control unit for the electric motor 38 and/or of the electric motor 38, the soil processing machine will safely come to a standstill.

If the driving actuator 72 is in the driving preparation position corresponding to the driving preparation state, which is generally the case when an operator acting on the driving actuator 72 is sitting on the operator's seat 24, the electric motor 38 of the electrohydraulic pressurized fluid source 36 can be operated by the control unit 42 in such a way that it rotates at a base speed. As a result, a pressure is built up in the hydraulic steering circuit 34, which pressure can also be used, for example, to operate one or more of the working hydraulic systems 67, for example to release a parking brake. In this case, for example, the base speed can be permanently specified. However, the base speed can also depend on influencing variables, such as, e.g., the temperature of the pressurized fluid in the hydraulic steering circuit 34 or in the region of one or more of the working hydraulic systems 67, so that, for example, as the temperature of the pressurized fluid increases, the base speed is increased to ensure faster exchange of the pressurized fluid. The base speed can also be set or increased as a function of the load requirement in the working hydraulic system(s) 67. For example, if it is detected that several such working hydraulic systems 67 are to be activated simultaneously, which corresponds to a high load requirement and is indicated, for example, by the fact that one or more such working hydraulic systems 67 are operated at too low a speed with the existing base speed, the base speed can be increased accordingly.

If the driving actuator 72 is brought into the driving position corresponding to the driving state, the voltage applied to the electric motor 38 of the electrohydraulic pressurized fluid source 36 can be specified under the control effect of the control unit 42 in such a way that the electric motor 38 is operated at a working speed higher than the base speed, wherein the working speed can be fixed, for example, or adapted, similarly as the base speed, depending on the temperature of the pressurized fluid in the hydraulic steering circuit 34 and/or the load requirement in one or more of the working hydraulic systems 67.

The control unit 42 can adapt the working speed of the electric motor 38 of the electrohydraulic pressurized fluid source 36 taking into account the steering information, for example information about the steering angle or a steering angle change rate to be provided according to an actuation of the steering actuator 66. This is described below with reference to FIG. 3 using the steering angle change rate L as an example.

Figure 3:
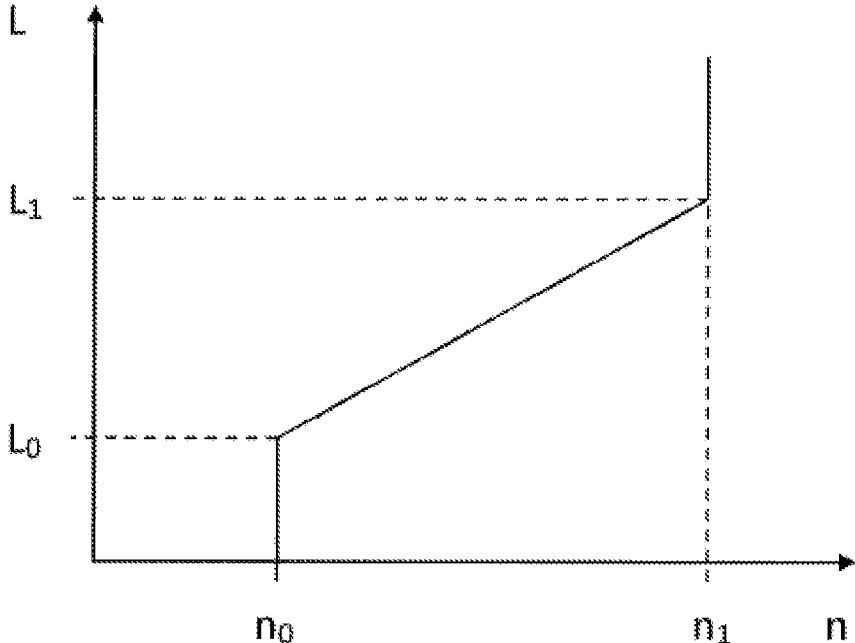
FIG. 3 shows a relationship between a steering angle change rate and a speed of an electric motor of an electrohydraulic pressurized fluid source of the hydraulic steering system from FIG. 2.

FIG. 3 shows a relationship between the steering angle change rate L and the speed n of the electric motor 38. The speed n of the electric motor 38 can be operated, for example, until a lower threshold $L_0$ is reached, at a substantially constant speed no, which can correspond, for example, to the previously described working speed. If an upper threshold $L_1$ of the steering angle change rate L is exceeded, the electric motor 38 is operated at a higher speed $n_1$. The electric motor 38 is operated at a speed n between the lower threshold $L_0$ and the upper threshold $L_1$, which speed, for example, is linearly related to the steering angle change rate L. This means that, between the thresholds $L_0$ and $L_1$, the electric motor 38 is controlled in such a way that its speed n changes proportionally to the steering angle change rate L.

It should be pointed out that other relationships can also be provided between the rotational speed n of the electric motor 38 and the steering angle change rate L. For example, a progressive or degressive increase in the speed n, as well as a stepwise increase, can be provided with the steering angle change rate L.

By adapting the speed of the electric motor 38 to the steering angle change rate L, it is possible to react to a high load requirement in the hydraulic steering system 30, represented by a high steering angle change rate L, and to ensure that sufficient pressurized fluid is made available in the steering hydraulic system 34 in order to produce a quick steering response. This is possible with the steering system 30 shown in FIG. 2 because the electric motor 38 reacts very quickly to a change in the voltage applied thereto with a corresponding change in speed, so that an action on the steering actuator 66 can be responded to essentially without a time delay. For this purpose, it is not necessary to carry out any adjustment measures on the hydraulic steering pump 40 in order to adapt the delivery volume thereof. The change in the delivery volume of the hydraulic steering pump 40 is carried out exclusively by changing the speed of same or the speed of the electric motor 38 driving the pump. The hydraulic steering pump 40 can therefore be a constant delivery pump, which ensures simple construction of the hydraulic steering system 30 and a simple controllability of same.

As an alternative or in addition to considering the steering angle change rate L when controlling the electric motor 38, the steering angle itself can also be used to adapt the speed of the electric motor 38. For example, as the steering angle increases, the speed of the electric motor 38 can also be increased, for example, in a substantially linear relationship corresponding to FIG. 3, a progressively or degressively increasing relationship, or a stepped relationship.

Upon entering the driving state or in the driving state, the procedure can basically be such that the speed of the electric motor 38 is set or increased to the working speed that may have been determined or adapted in the manner described above. In an alternative procedure, provision can be made for the electric motor 38 to be operated at the working speed only upon entering the driving state or in the driving state when there is a change in the steering state, for example when driving straight ahead is to be changed to cornering, cornering is to be changed to straight-ahead driving, or the curve radius is to be changed when cornering. If the steering state does not change, for example a soil processing machine remains in a previously existing steering state when it enters the driving state or is in the driving state, which means that either the soil processing machine is being driven straight ahead or cornering with an essentially constant curve radius, the speed of the electric motor 38 is not increased to the working speed, since an increased force does not have to be applied to change the steering state. If the driving state changes from a state in which the steering state changes to a state in which the steering state does not change, the speed of the electric motor 38, which was initially operated at the working speed, can be reduced back to the base speed, for example. This leads to efficient, energy-saving operation of the hydraulic steering system 30.

In a soil processing machine constructed according to the invention, the use of an electrohydraulic pressurized fluid source creates the possibility of very quickly adapting the operation of same to the existing or required steering operation. This reduces the energy consumption, since a high working performance of the electric motor of the electrohydraulic pressurized fluid source of the hydraulic steering system is only present or used when it is necessary. Nevertheless, such a system can be operated at the base speed in order to maintain a basic functionality, for example, of the hydraulic steering system or working hydraulic systems to be thereby supplied. In the soil processing machine constructed according to the invention, the advantages of a hydraulic steering system are thus combined with those from the use of an electric motor for operating a hydraulic steering pump with regard to efficient use of energy or energy saving or also reduced noise emissions in phases in which operation at comparatively low speed is sufficient.

Finally, it should be pointed out that such a soil processing machine can of course be varied in a wide variety of aspects. Thus, with the hydraulic steering system, the electrohydraulic pressurized fluid source can comprise a plurality of steering pressurized fluid pumps, wherein these can be operated by a common electric motor or, if appropriate, a separate electric motor of the electrohydraulic pressurized fluid source. Several hydraulic drive pumps can also be provided in the region of the hydraulic drive system, which pumps can be driven by a common electric motor or, if appropriate, by respectively separate electric motors. As already explained, a soil processing machine designed as a soil compactor, for example, can of course be designed differently than previously described or shown in FIG. 1 with regard to the use of soil processing rollers or drive wheels.

The invention claimed is:

1. A soil processing machine comprising:
a hydraulic steering system with at least one steering element actuated with pressurized fluid and an electrohydraulic steering pressurized fluid source with at least one hydraulic steering pump driven by at least one electric motor for feeding pressurized fluid into a hydraulic steering circuit; and
a hydraulic drive system, wherein the hydraulic drive system includes an electrohydraulic pressurized fluid source with at least one electric motor and at least one hydraulic drive pump for supplying pressurized fluid to a hydraulic drive circuit and at least one hydraulic drive motor supplied with pressurized fluid from the hydraulic drive circuit,
wherein at least one electric motor of the at least one electric motor of the electrohydraulic steering pressurized fluid source of the hydraulic steering system and at least one electric motor of the at least one electric motor of the electrohydraulic pressurized fluid source of the hydraulic drive system are selectively operated independently of one another.

2. The soil processing machine according to claim 1, further comprising a rear carriage and a front carriage pivoted about a steering axis with respect to the rear carriage, wherein the at least one steering element acting between the front carriage and the rear carriage comprises a steering piston/cylinder unit.

3. The soil processing machine according to claim 1, wherein the hydraulic steering system comprises a hydraulic steering unit, wherein the hydraulic steering unit is supplied with pressurized fluid from the hydraulic steering circuit and the at least one steering element is exposed to pressurized fluid depending on an actuation of a steering actuator.

4. The soil processing machine according to claim 1, wherein the hydraulic steering system comprises at least one steering sensor, wherein the steering sensor is configured to provide steering information representing a steering state.

5. The soil processing machine according to claim 4, wherein the steering information represents a steering angle and/or a steering angle change rate.

6. The soil processing machine according to claim 4, wherein the hydraulic steering system is configured to operate the at least one electric motor of the electrohydraulic steering pressurized fluid source at a speed dependent on the steering information.

7. The soil processing machine according to claim 6, wherein the hydraulic steering system is configured to operate the at least one electric motor of the electrohydraulic steering pressurized fluid source at increasing speed as a steering angle increases, and/or in that the hydraulic steering system is designed to operate the at least one electric motor of the electrohydraulic steering pressurized fluid source at increasing speed as a steering angle change rate increases.

8. The soil processing machine according to claim 1, wherein the hydraulic steering system is configured to operate the at least one electric motor of the electrohydraulic steering pressurized fluid source at a speed dependent on a driving operating state of the soil processing machine.

9. The soil processing machine according to claim 8, wherein the driving operating state of the soil processing machine comprises the following states:

a parking state, wherein a driving actuator is placed in a parking position and/or an operator's seat is not occupied in the parking state;

a driving preparation state, wherein the driving actuator is placed in a driving preparation position in the driving preparation state;

a driving state, wherein the driving actuator is placed in a driving position in the driving state;

wherein the hydraulic steering system is configured to keep the at least one electric motor of the electrohydraulic steering pressurized fluid source out of operation in the parking state; and/or to operate the at least one electric motor of the electrohydraulic steering pressurized fluid source at a base speed in the driving preparation state; and/or to operate the at least one electric motor of the electrohydraulic steering pressurized fluid source at a working speed which is higher than the base speed in the driving state.

10. The soil processing machine according to claim 9, wherein the base speed depends on a temperature of the hydraulic fluid in the hydraulic steering circuit and/or in a working hydraulic system fed from the hydraulic steering circuit, and/or in that the base speed depends on a load requirement in a working hydraulic system fed from the hydraulic steering circuit.

11. The soil processing machine according to claim 9, wherein the hydraulic steering system is designed to operate the at least one electric motor of the electrohydraulic steering pressurized fluid source always at the working speed in the driving state.

12. The soil processing machine according to claim 9, wherein the hydraulic steering system is configured to operate the at least one electric motor of the electrohydraulic steering pressurized fluid source at the working speed upon entering the driving state and/or in the driving state when the steering information indicates the presence of a change in the steering state.

13. The soil processing machine according to claim 1, wherein the at least one hydraulic steering pump is a constant delivery rate pump.

14. The soil processing machine according to claim 1, wherein the hydraulic steering system is designed to replenish pressurized fluid to the hydraulic drive circuit via the hydraulic steering circuit.

15. The soil processing machine according to claim 1, wherein the hydraulic steering system is designed to return pressurized fluid to a fluid reservoir via the hydraulic steering circuit.

16. The soil processing machine according to claim 1, wherein the soil processing machine is a soil compactor.

* * * * *